US012715120B2

(12) United States Patent
Esaki et al.

(10) Patent No.: US 12,715,120 B2
(45) Date of Patent: Aug. 25, 2026

(54) INFORMATION PROCESSING SYSTEM AND AUTONOMOUS SYSTEM

(71) Applicant: Hitachi, Ltd., Tokyo (JP)

(72) Inventors: Kanako Esaki, Tokyo (JP); Hiroyuki Mizuno, Tokyo (JP); Tadayuki Matsumura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 54 days.

(21) Appl. No.: 18/414,014

(22) Filed: Jan. 16, 2024

(65) Prior Publication Data

US 2024/0269834 A1 Aug. 15, 2024

(30) Foreign Application Priority Data

Feb. 15, 2023 (JP) ................................ 2023-021475

(51) Int. Cl.
*B25J 9/16* (2006.01)
*B25J 11/00* (2006.01)

(52) U.S. Cl.
CPC ............... *B25J 9/163* (2013.01); *B25J 9/161* (2013.01); *B25J 9/1697* (2013.01); *B25J 11/0045* (2013.01)

(58) Field of Classification Search
USPC .................................................. 700/245–264
See application file for complete search history.

(56) References Cited

U.S. PATENT DOCUMENTS 6,636,781 B1 * 10/2003 Shen ........................ B25J 9/065 703/2
8,972,053 B2 * 3/2015 Bruemmer ................. B25J 9/08 700/247
11,370,123 B2 * 6/2022 Lee .......................... B25J 5/007
12,518,582 B2 * 1/2026 Skaaksrud ........... G06Q 10/083
2004/0162638 A1 * 8/2004 Solomon ............. G05D 1/0088 700/247
2005/0021483 A1 * 1/2005 Kaplan .................. G06N 3/004 706/12
2011/0077773 A1 * 3/2011 Yu ............................ B25J 13/08 700/253
2016/0184993 A1 * 6/2016 Brandwijk ............... B25J 9/101 463/31

(Continued)

FOREIGN PATENT DOCUMENTS

JP 4280999 B2 6/2009
WO WO 2022/223941 A1 10/2022

OTHER PUBLICATIONS

Japanese-language Office Action issued in Japanese Application No. 2023-021475 dated May 19, 2026 with English translation (6 pages).

*Primary Examiner* — Jonathan L Sample
(74) *Attorney, Agent, or Firm* — Crowell & Moring LLP

(57) ABSTRACT

Provided is an information processing system for an autonomous system, the information processing system obtaining observation sensor data in the autonomous system and a target of the autonomous system, and including: an agent management unit that stores and manages an agent group; an attention unit configured to select an agent from the agent group based on the target; and an agent cooperation unit configured to generate a new agent in which inputs and outputs of selected agents are integrated and to train a generative model of the new agent based on the observation sensor data.

6 Claims, 11 Drawing Sheets

(56) References Cited

U.S. PATENT DOCUMENTS

| | | | | |
|---|---|---|---|---|
| 2017/0320210 | A1* | 11/2017 | Ding | B25J 9/1661 |
| 2018/0319014 | A1* | 11/2018 | Dukatz | B25J 9/163 |
| 2019/0369641 | A1* | 12/2019 | Gillett | B25J 9/08 |
| 2020/0016748 | A1* | 1/2020 | Martin | B25J 13/025 |
| 2020/0074241 | A1* | 3/2020 | Mahmood | B25J 9/163 |
| 2021/0387346 | A1* | 12/2021 | Gillett | B25J 19/0075 |
| 2022/0197306 | A1* | 6/2022 | Cella | G05D 1/0297 |
| 2023/0234233 | A1* | 7/2023 | Goyal | G06T 7/269 |
| 2023/0244191 | A1* | 8/2023 | Honkote | G05B 13/0265 700/47 |
| 2024/0217548 | A1* | 7/2024 | Pronovost | B60W 50/0097 |

* cited by examiner

1
SENSOR/ACTUATOR
Rw3
Rw2
Rw1
Re
L
Rb
Rs
ANGLE
CURRENT VALUE
24
AGENT COOPERATION UNIT
Agw3
Agw2
Agw1
Age
Ags
Agb
Agn
NEW AGENT
PARAMETERS OF GENERATIVE MODEL
$w_1$
$w_2$
$w_n$

| WRIST 3 ANGLE | WRIST 3 CURRENT VALUE | WRIST 2 ANGLE | WRIST 2 CURRENT VALUE | ... | BASE ANGLE | BASE CURRENT VALUE |
|---|---|---|---|---|---|---|
| 0 | 0 | 92 | 92 | | 60 | 60 |
| 1 | 1 | 88 | 88 | | 65 | 65 |
| 2 | 2 | 100 | 100 | | 70 | 70 |
| 1 | 1 | 80 | 80 | | 72 | 72 |
| 1 | 1 | 10 | 10 | | 5 | 5 |
| 1 | 1 | 85 | 85 | | 68 | 68 |
| 0 | 0 | 101 | 101 | | 67 | 67 |

INFORMATION PROCESSING SYSTEM AND AUTONOMOUS SYSTEM

CLAIM OF PRIORITY

The present application claims priority from Japanese Patent application serial no. 2023-21475, filed on Feb. 15, 2023, the content of which is hereby incorporated by reference into this application.

BACKGROUND OF THE INVENTION

1. Field of the Invention

The present invention relates to an information processing system and an autonomous system.

2. Description of the Related Art

In a human daily living space, various autonomous systems that coexist with humans are expected. An autonomous system coexisting with humans is required to take an action even in a situation where it is not possible to define in advance a target of the system. For example, in a case where the autonomous system is a serving robot, when the robot serves a meal in a restaurant where the robot enters for the first time (accordingly, the robot does not have a map of the restaurant or information on a service form), there are some cases such as a case where a kitchen and a serving location are close as in self-service restaurants, and a case where the kitchen and the serving location are far apart as in table service restaurants. Thus, it is not possible to define in advance a target of the system, while it is required to perform an operation depending on a target on the spot. For example, when the robot enters the restaurant and determines that the kitchen and the serving location are close, moving only an arm of the robot is required, and when the robot determines that the kitchen and the serving location are far apart, moving the arm of the robot while moving the robot itself is required.

Regarding an autonomous system, JP 4280999 B2 discloses that, in a modular robot, motion control in each degree of freedom is modeled with a nonlinear oscillator, and oscillation periods are matched with each other or a phase difference is generated in a cooperative manner between the degrees of freedom, thereby resulting in stable overall motion.

SUMMARY OF THE INVENTION

In a conventional autonomous system, a type of input and output of the system depending on a target of the system is defined in advance and a relational expression of the input and output is trained to form a generative model depending on the target of the system, which can realize an operation depending on the target.

Thus, in a situation where it is not possible to define in advance the target of the system, there is a problem that the type of input and output of the system depending on the target of the system cannot be defined in advance and the generative model cannot be formed.

In this regard, in JP 4280999 B2, operation contents of the modular robot are set in advance, and a type of input and output of the system is defined in advance and a relational expression of the input and output is modeled and trained to form a generative model depending on a target of the system. Thus, in a situation where it is not possible to define in advance the type of input and output depending on the target of the system, the generative model cannot be formed and effective control of the autonomous system is difficult.

From the above, an object of the present invention is to provide an information processing system that enables effective control of an autonomous system even in a situation where it is not possible to define in advance a type of input and output depending on a target of the system, and the autonomous system.

From the above, an aspect of the present invention is "an information processing system for an autonomous system, the information processing system obtaining observation sensor data in the autonomous system and a target of the autonomous system, and including: an agent management unit that stores and manages an agent group; an attention unit configured to select an agent from the agent group based on the target; and an agent cooperation unit configured to generate a new agent in which inputs and outputs of selected agents are integrated and to train a generative model of the new agent based on the observation sensor data".

Another aspect of the present invention is "an autonomous system including an actuator configured to receive an output from an action generation unit in the information processing system for the autonomous system to operate".

According to the present invention, it is possible to appropriately select an agent depending on a target of a system and to dynamically form a generative model, which enables effective control of the autonomous system even in a situation where it is not possible to define in advance a type of input and output depending on the target of the system.

DESCRIPTION OF THE PREFERRED EMBODIMENTS

Hereinafter, embodiments of the present invention will be described in detail with reference to the drawings. Note that, although an information processing system that controls an autonomous robot will be described in embodiments of the present invention, an autonomous system is not limited to an autonomous robot.

First Embodiment

In a first embodiment, an information processing system that controls an autonomous robot will be described. The autonomous robot exemplified here is as illustrated in FIG. 1.

Figure 1:
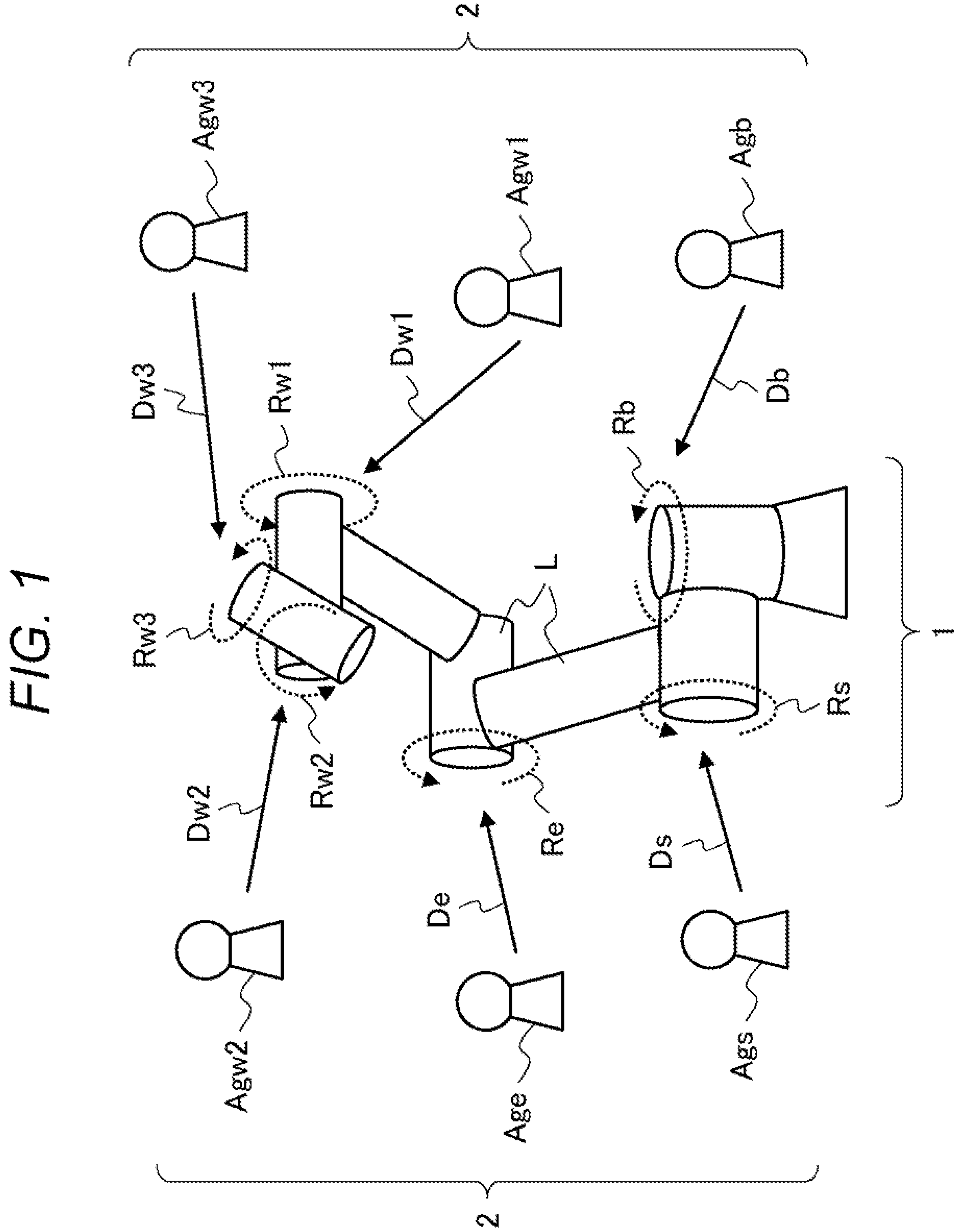
FIG. 1 is a diagram illustrating a configuration example of an autonomous robot as an autonomous system.

The robot 1 in FIG. 1 is constructed by linkage of a plurality of links L having joint portions R. A base portion Rb, a shoulder portion Rs, an elbow portion Re, and wrist portions Rw1, Rw2, and Rw3 as the joint portions R are connected sequentially from a base part by the links L.

Each joint portion R includes an actuator that drives the joint portion R and a sensor that detects various data. The actuator is, for example, a motor and the sensor detects information on the current applied to the motor and the position of the joint portion R. Note that the sensor may detect not only information of the robot 1 itself but also information of a site environment where the robot 1 is disposed or information on a relative position or distance.

In each joint portion R of the robot 1, the actuator of the joint portion R is given a command D from an agent Ag in an information processing system 2 according to the present invention to perform a predetermined operation, and the position of the joint portion as an operation result is returned to the information processing system 2 via the sensor. Specifically, a base agent Agb gives a command Db to the base portion Rb, a shoulder agent Ags gives a command Ds to the shoulder portion Rs, an elbow agent Age gives a command De to the elbow portion Re, and wrist agents Agw1, Agw2, and Agw3 give commands Dw1, Dw2, and Dw3 to the wrist portions Rw1, Rw2, and Rw3, respectively. The agents associated with the hardware configuration of the autonomous robot system are referred to as primitive agents.

Figure 2:
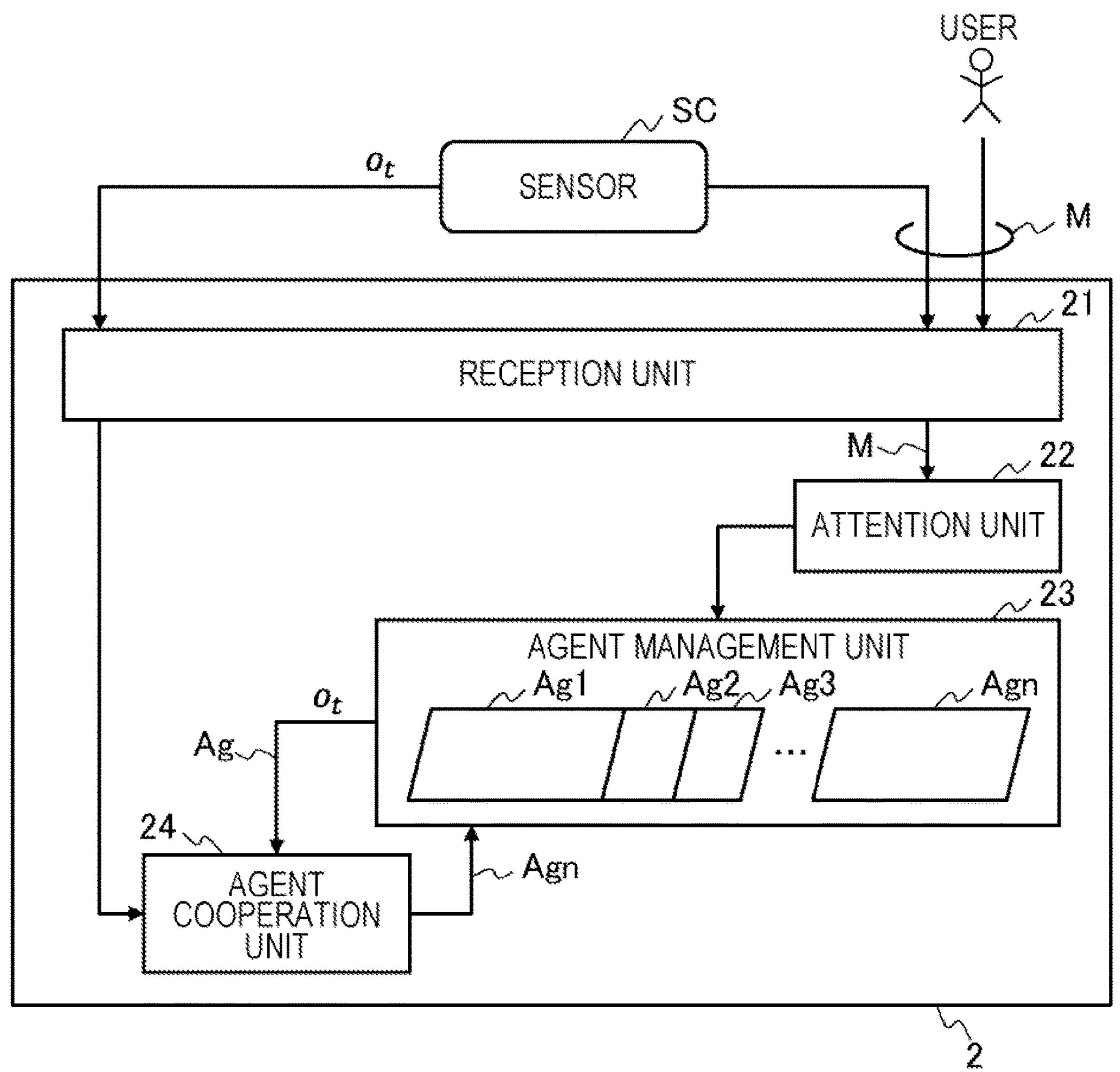
FIG. 2 is a diagram illustrating a configuration example of an information processing system according to a first embodiment of the present invention.

FIG. 2 illustrates a configuration example of the information processing system for the autonomous system according to the first embodiment of the present invention.

In FIG. 2, the information processing system 2 that controls the autonomous robot 1 includes: a reception unit 21 that acquires observation sensor data Ot regarding the autonomous robot and a surrounding environment of the autonomous robot, and a target or target category M (hereinafter, sometimes simply referred to as target when no distinction is required in particular) of the autonomous robot 1 from various sensors SC arranged in the autonomous robot 1; an attention unit 22 that selects a plurality of agents Ag from an agent group on the basis of the target or target category M; an agent management unit 23 that stores and manages the agent group; and an agent cooperation unit 24 that generates a new agent Agn in which inputs and outputs of the selected agents Ag are integrated and trains a generative model of the new agent Agn on the basis of the observation sensor data Ot. Note that the target or target category M may be determined from outputs of the sensors SC or may be input by a user.

Figure 3:
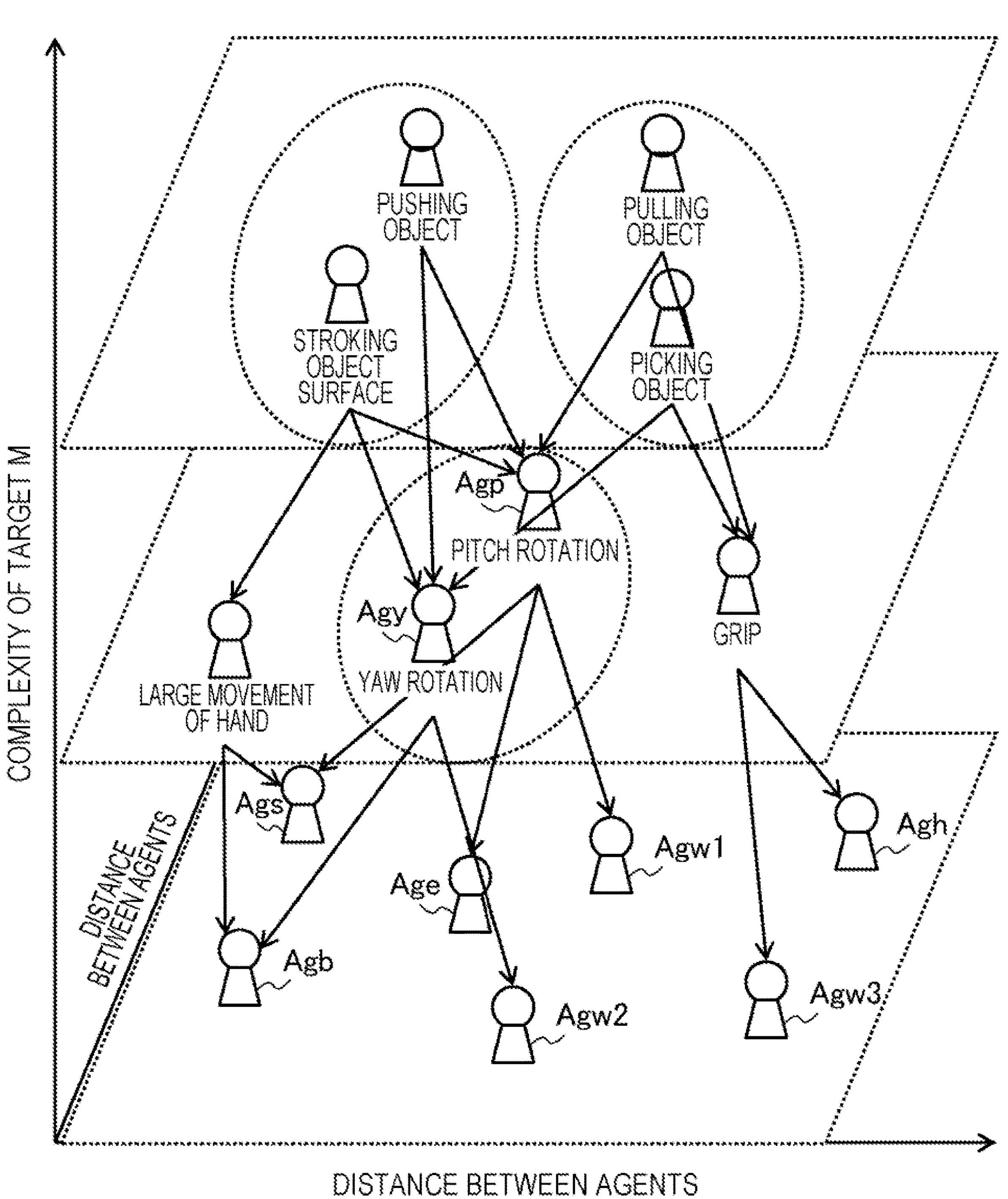
FIG. 3 is a diagram for explaining a concept of an attention unit and an agent management unit.

FIG. 3 is a diagram for explaining a concept of the attention unit 22 and the agent management unit 23. In FIG. 3, a distance between agents is indicated in the horizontal axis plane and the vertical axis indicates complexity of a target of an agent.

A target of an agent on the vertical axis corresponds to a target or target category M of the system given from the reception unit 21, and is a target for an operation of the robot, specifically such as pulling an object, picking an object, pushing an object, stroking an object surface, grip, pitch rotation, yaw rotation, large movement of a hand, moving a hand joint, moving a wrist joint, moving an elbow joint, moving a shoulder joint, or moving a base joint. In this figure, the further up the target operation appears, the more complicated the target operation is.

Further, in this figure, the distances between the agents on the horizontal axis plane are equivalent to the distances between the joint portions of the robot in FIG. 1. The agents Agb, Ags, Age, Agw1, Agw2, Agw3, and Agh corresponding to, sequentially from the base part, the base portion Rb, the shoulder portion Rs, the elbow portion Re, the wrist portions Rw1, Rw2, and Rw3, and a hand Rh are arranged in accordance with the distances when the joint portions are arranged.

In addition, there are relationships in which a target on the vertical axis is executed by a combination of a plurality of agents. For example, arrows in FIG. 3 indicate a relationship in which the target of pitch rotation is realized by a cooperative operation of Ags, Age, and Agw1, and a relationship in which the target of yaw rotation is realized by a cooperative operation of Agb and Agw2. These relationships are referred to as attention. For example, an agent Agp for pitch rotation has attention to Ags, Age, and Agw1. In the cooperative operation, operations may not necessarily be performed at the same time and there may be a lag in the execution timing of the operations, such as executing the operation of grip and then executing the operation of yaw rotation for the target of picking an object.

The attention unit 22 determines, on the basis of the relationships in FIG. 3 in the autonomous robot 1 depending on the input target M, an agent Ag for achieving this target M and gives an ID of the selected agent Ag to the agent management unit 23 together with a target content.

Note that the attention unit 22 and the agent management unit 23 manage the agents Ag together with the distances between the agents, the complexity of the targets, and the attention illustrated in FIG. 3. In this regard, the distance between agents in the horizontal axes is determined by the closeness between the targets of the agents or the like. For example, yaw rotation and pitch rotation are both operations to move a robot arm in a specific direction although the rotation directions are different, and thus the agents for them are arranged close to each other. In addition, for example, in the case of the primitive agents, movements of the joints are more similar as the distances on the hardware configuration (distances between the joint portions of the robot in FIG. 1) are closer. In light of this, the agents Agb, Ags, Age, Agw1, Agw2, Agw3, and Agh corresponding to, sequentially from the base part, the base portion Rb, the shoulder portion Rs, the elbow portion Re, the wrist portions Rw1, Rw2, and Rw3, and the hand Rh are arranged on the basis of the distances on the hardware configuration.

Regarding the complexity of a target, the primitive agents have lowest complexity, and a new agent Agn (agent generated by the agent cooperation unit 24, which will be described later in detail) formed by integrating agents having a certain level of complexity is positioned on the diagram of FIG. 3 so as to have higher complexity. Agents Ag of which targets M are close are labeled together as the same target category (surrounded by the dotted circle). For example, pitch rotation and yaw rotation, which are both targets, can be categorized into the same target category such as "arm rotation".

The attention unit 22 selects, on the basis of the target or target category M acquired from the user or the sensors SC, an agent that has been registered in the agent management unit 23. When the agent for the acquired target or target category M has not been learned and the attention unit 22 has no basis for the agent selection, all the primitive agents are selected. When the agent for the acquired target has not been learned but an agent belonging to the same target category M has been learned, an agent group to which this agent has attention may be selected. In addition, when the target itself is unknown, all the primitive agents are selected.

Returning to FIG. 2, the agent management unit 23 holds the primitive agents in the six-axis robot arm illustrated in FIG. 1 in the initial state of the information processing system 1. The primitive agents are associated with the hardware configuration of the autonomous robot system.

In the case of the six-axis robot arm in FIG. 1, agents Ag (Ag1, Ag2, . . . , Agn) having respective generative models associated with the joints (base Rb, shoulder Rs, elbow Re, wrist Rw1, wrist Rw2, wrist Rw3) are registered in the agent management unit 23 as the primitive agents in the initial state.

Each agent Ag has a generative model that is a relational expression of input and output. The generative model corresponds to, for example, a generative model in the brain explained by the free energy principle. In the free energy principle, a generative process (outside the brain) and a generative model (inside the brain) are considered separately. The generative model is brought closer to the generative process by perceptual inference (update of the generative model) and active inference (change of action).

Thus, the agent cooperation unit 24 is given the agent Ag selected depending on the target. The agent is, for example, a learned Agp selected for the target of pitch rotation or a learned Agy selected for the target of yaw rotation. Alternatively, when there is no agent corresponding to the target or target category in the agent group registered in the agent management unit 23, the attention unit 22 selects all the primitive agents as the intended agents.

Figure 4:
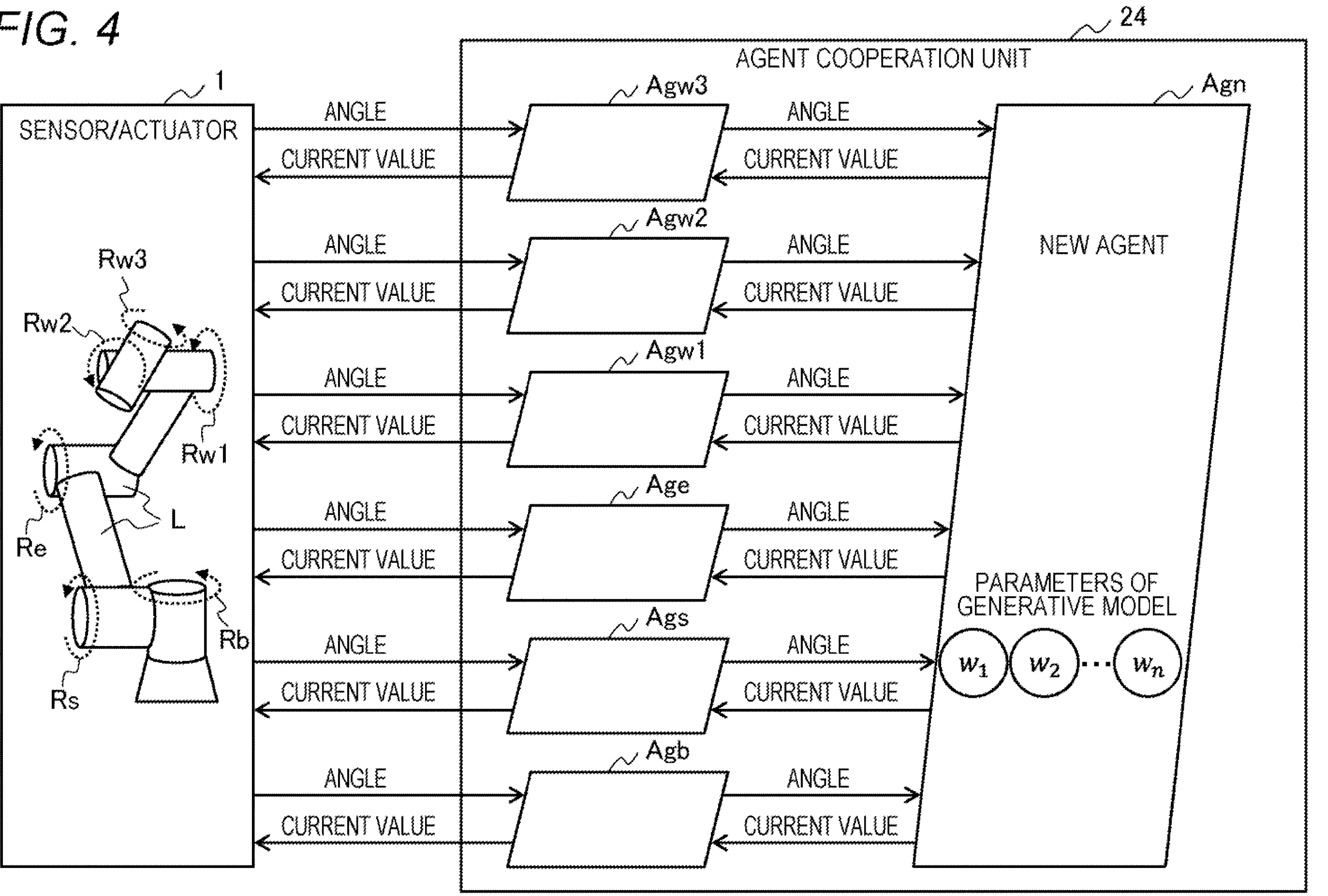
FIG. 4 is a diagram illustrating processing of an agent cooperation unit.

FIG. 4 is a diagram illustrating processing of the agent cooperation unit 24 when the agent corresponding to the target or target category has not been learned and all the primitive agents are selected. Here, a new agent Agn having a generative model is generated. In the initial state, the new agent Agn receives outputs from the selected all primitive agents as input and returns outputs to all the primitive agents. Each primitive agent performs input and output with the sensor SC and the actuator arranged on the corresponding joint portion R (base portion Rb, shoulder portion Rs, elbow portion Re, wrist portion Rw1, Rw2, Rw3) of the robot 1. The agent cooperation unit 24 performs training using inputs and outputs (for example, the input is a joint angle and the output is a motor current value) of the primitive agents (wrist 3 agent Agw3, wrist 2 agent Agw2, wrist 1 agent Agw1, elbow agent Age, shoulder agent Ags, and base agent Agb) and updates parameters of the generative model of the new agent Agn. The training may update not only the parameters of the generative model of the new agent Agn but also parameters of the primitive agents.

Figure 5:
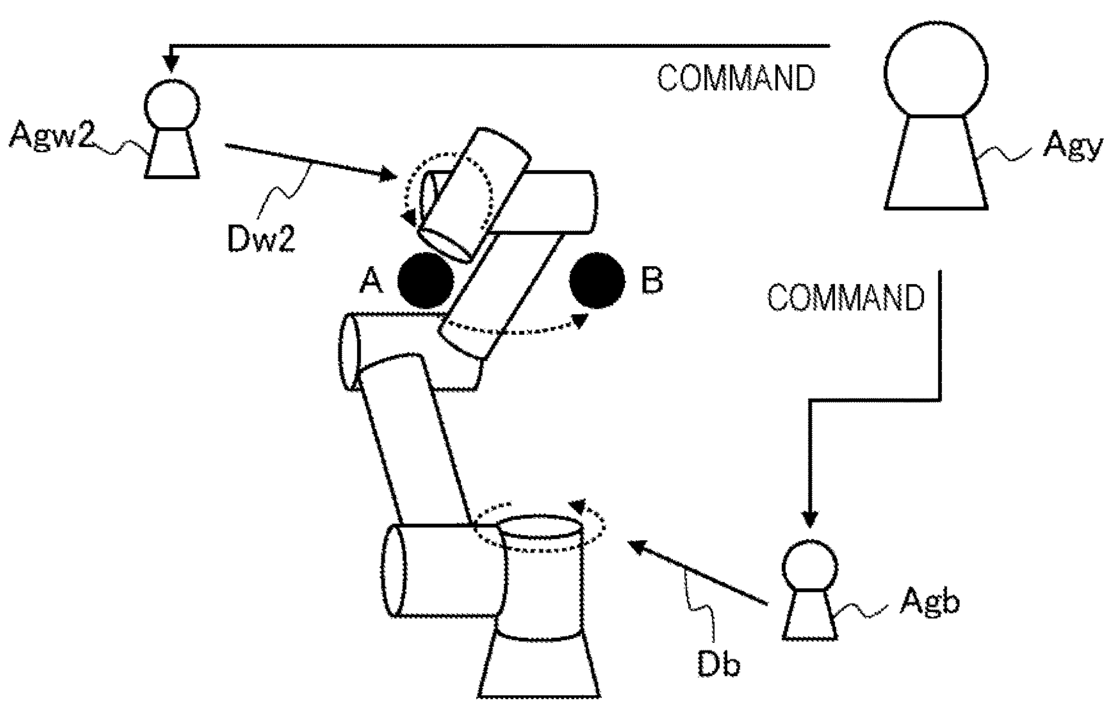
FIG. 5 is a diagram illustrating an example of a new agent obtained for a target of yaw rotation.
Figure 6:
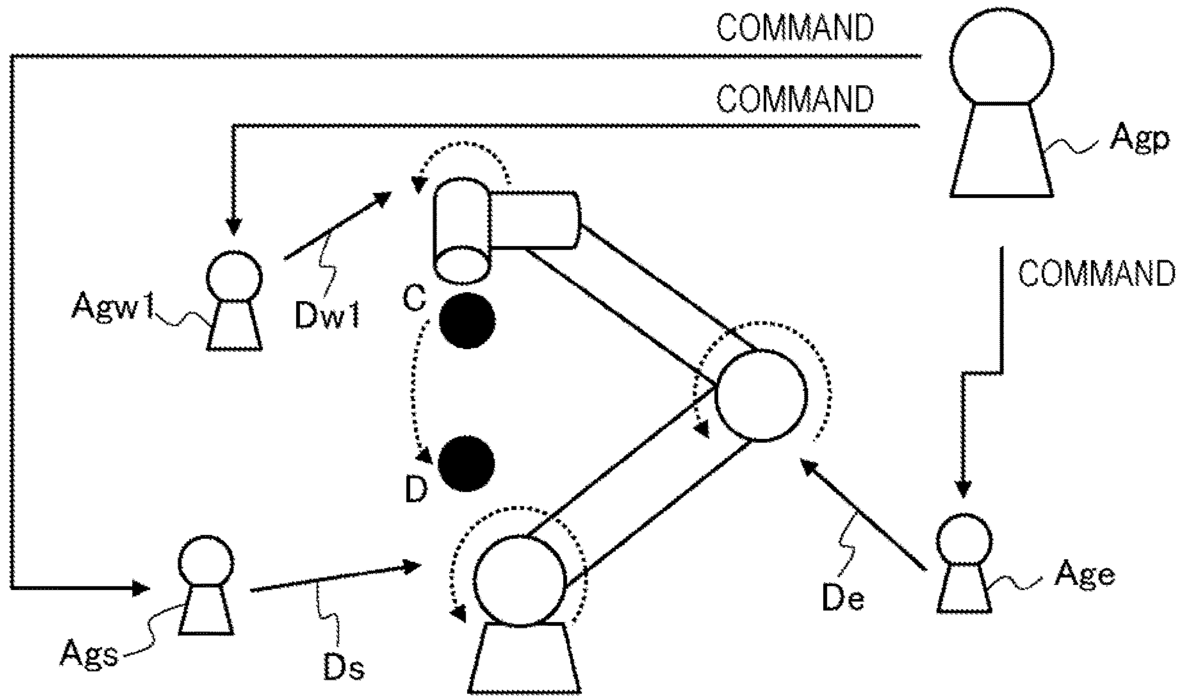
FIG. 6 is a diagram illustrating an example of a new agent obtained for a target of pitch rotation.

FIGS. 5 and 6 are diagrams illustrating examples of the new agent Agn generated by the processing of the agent cooperation unit 24.

FIG. 5 is a diagram illustrating an example of the new agent obtained as a result of learning by selecting the base agent Agb and the wrist agent Agw2 for the target of yaw rotation and shows that the base agent Agb, the wrist agent Agw2, and the newly generated yaw agent Agy positioned above these agents are generated and registered in the agent management unit 23.

FIG. 6 is a diagram illustrating an example of the new agent obtained as a result of learning by selecting the shoulder agent Ags, the elbow agent Age, and the wrist agent Agw1 for the target of pitch rotation and shows that the shoulder agent Ags, the elbow agent Age, the wrist agent Agw1, and the newly generated pitch agent Agp positioned above these agents are generated and registered in the agent management unit 23.

The newly generated yaw agent Agy and pitch agent Agp are higher-level agents that enable smooth operations for achieving the targets of yaw rotation and pitch rotation by linking the respective lower-level agents, and function to provide appropriate cooperative operation commands.

FIGS. 5 and 6 show specific examples of the agents in the six-axis robot arm. FIG. 5 shows a case where the position of a robot arm tip is moved from the point A to the point B (yaw direction) and FIG. 6 shows a case where the position of the robot arm tip is moved from the point C to the point D (pitch direction). Assume that, from the hardware structure of the robot arm, even for the same "movement" work, only the base and the wrist 2 are moved in FIG. 5, and only the shoulder, the elbow, and the wrist 1 are moved in FIG. 6. At this time, the yaw agent Agy in which inputs and outputs of the base agent and the wrist 2 agent are integrated is formed in FIG. 5, and the pitch agent Agp in which inputs and outputs of the shoulder agent, the elbow agent, and the wrist 1 agent are integrated is formed in FIG. 6. The yaw agent Agy and the pitch agent Agp are also registered in the agent management unit 23 after the update of the generative models of the agents converges.

Returning to FIG. 3, regarding the relationships in the vertical and horizontal directions after the processing by the agent cooperation unit 24, assume that the distances between the agents Ag arranged in the lowermost layer are not the distances according to the mechanical arrangement but the distances after learning and accordingly reviewing the positioning. In addition, the yaw agent Agy and the pitch agent Agp obtained by learning are newly additionally arranged at an appropriate distance on the plane of the intermediate layer. The arrangement relationships of these agents in FIG. 3 are reflected in the attention unit 22 as appropriate learning results.

Figure 7:
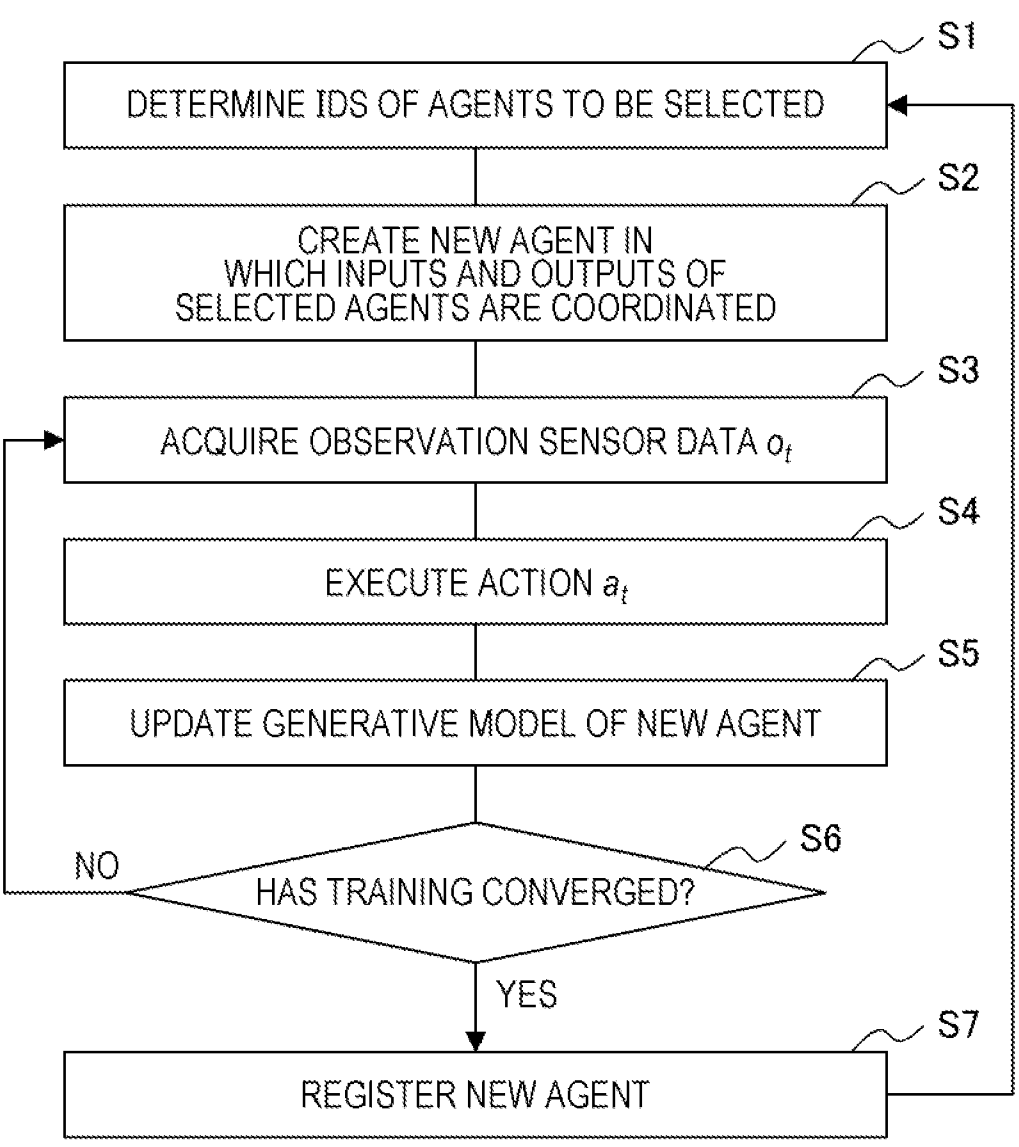
FIG. 7 is a diagram illustrating a processing flow of the information processing system.

The information processing system in FIG. 1 is configured using a computer device, and FIG. 7 illustrates a processing flow in that case.

In the operation flow of the first embodiment in FIG. 7, first, in processing step S1, the attention unit 22 determines the IDs of agents Ag to be selected on the basis of the target or target category M received from the reception unit 21. Next, in processing step S2, the agent cooperation unit 24 receives the agents Ag associated with the agent IDs determined by the attention unit 22 from the agent management unit 23 and creates a new agent Agn in which inputs and outputs of the agents are coordinated. In processing step S3, the agent cooperation unit 24 receives the observation sensor data Ot.

Thereafter, in processing step S4, an action $a_t$ of a corresponding time step of an action sequence $\{a_0, a_1, a_2, \ldots, a_n\}$ defined in advance by the user or a random action sequence is executed. Subsequently, in processing step S5, the parameters of the generative model of the new agent are updated using the observation sensor data and the action. In processing step S6, when training (update of the parameters) of the generative model has converged, in processing step S7, the new agent is registered in the agent management unit 23. When training has not converged, the processing returns to processing step S3, where the observation sensor data Ot is acquired again, and the similar processing is repeatedly executed.

As described above, in the present invention, only the primitive agents (each having a generative model) associated with the hardware configuration of the system are provided in advance, and a generative model depending on a target of the system is dynamically formed by linking the agents.

In this case, the attention function selects one or more agents depending on a target (or target category) of the system in a formation phase of a generative model, and selects an appropriate agent depending on a target of the system in a use phase of a generative model.

In addition, the agent cooperation function creates a new agent in which inputs and outputs of selected agents are coordinated, updates the generative model of the new agent to form the generative model. As a result, the information processing system can be provided that enables effective control of an autonomous system even in a situation where it is not possible to define the type of input and output depending on a target of the system.

As described above, an aspect of the present invention is "an information processing system for an autonomous system, wherein the information processing system obtains observation sensor data in the autonomous system and a target of the autonomous system, the information processing system including: an agent management unit that stores and manages an agent group; an attention unit configured to select an agent from the agent group based on the target; and an agent cooperation unit configured to generate a new agent in which inputs and outputs of selected agents are integrated and to train a generative model of the new agent based on the observation sensor data".

Second Embodiment

In the first embodiment, it has been described that the information processing system 2 generates a new agent by learning. In a second embodiment, it will be described that control is performed by further applying this learning result to the autonomous robot.

Figure 8:
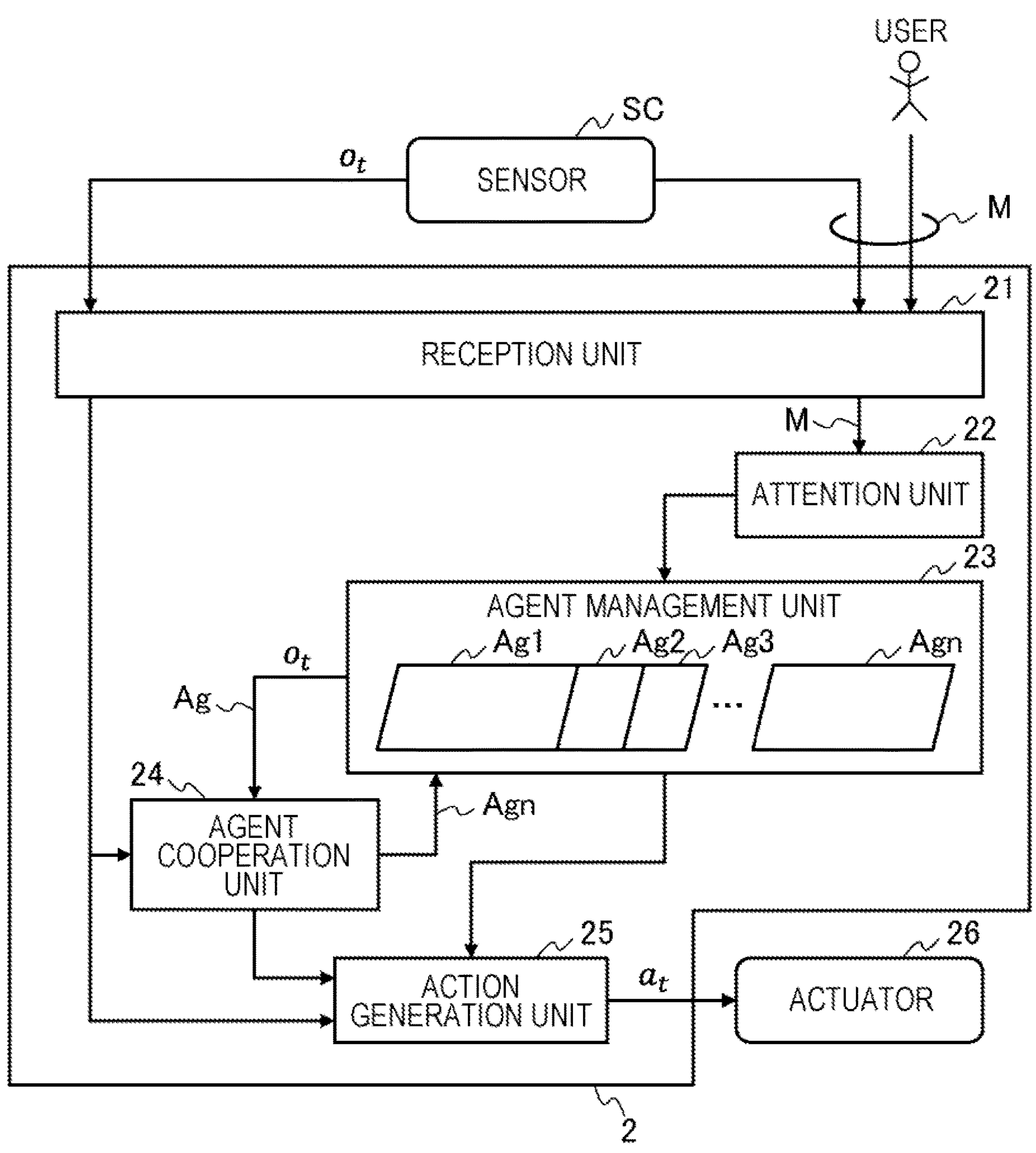
FIG. 8 is a diagram illustrating a configuration example of an information processing system according to a second embodiment of the present invention.

FIG. 8 illustrates a configuration example of an information processing system according to the second embodiment of the present invention. In FIG. 8, an action generation unit 25 and an actuator 26 are added to the configuration of the first embodiment in FIG. 2. Executing an action based on the generative model of a new agent Agn being trained allows the system to take an action with training at an operation site. Note that the actuator 26 includes the actuators that drive the joint portions R in FIG. 1.

In the case of the second embodiment, the agent management unit 23 holds a new agent Agn that has been generated and outputs an agent Ag selected on the basis of a target M, and the agent cooperation unit 24 updates a generative model associated with a further new agent Agn on the basis of the observation sensor data Ot and the selected agent Ag and outputs inter-agent cooperation information and the further new agent. The information processing system further includes the action generation unit 25 that generates an action on the basis of the inter-agent cooperation information and outputs the action to the actuator 26 of the autonomous system.

According to the second embodiment, a new agent corresponding to a target operation is extracted from the agent management unit 23 to generate an action, and thereby can be applied to the robot.

Third Embodiment

In the first embodiment, the attention unit 22 selects an agent to be trained by reference to the relationships in FIG. 3. However, in a case where the target is unexperienced or the agent is unexperienced at that time, all the agents are selected and a new agent for these agents is generated.

While this process of selecting all the agents produces an effect of enabling autonomous operation of the robot in an unexperienced environment, there is still a possibility that not only an agent effective in achieving a target but also an agent less effective in achieving the target is generated.

Thus, in a third embodiment, the agent cooperation unit 24 updates the attention of a new agent Agn. In addition to updating the parameters of the generative model of the new agent Agn in the first embodiment, an unnecessary input and output of an agent is pruned on the basis of a tendency of inputs and outputs of each agent.

Figure 9:
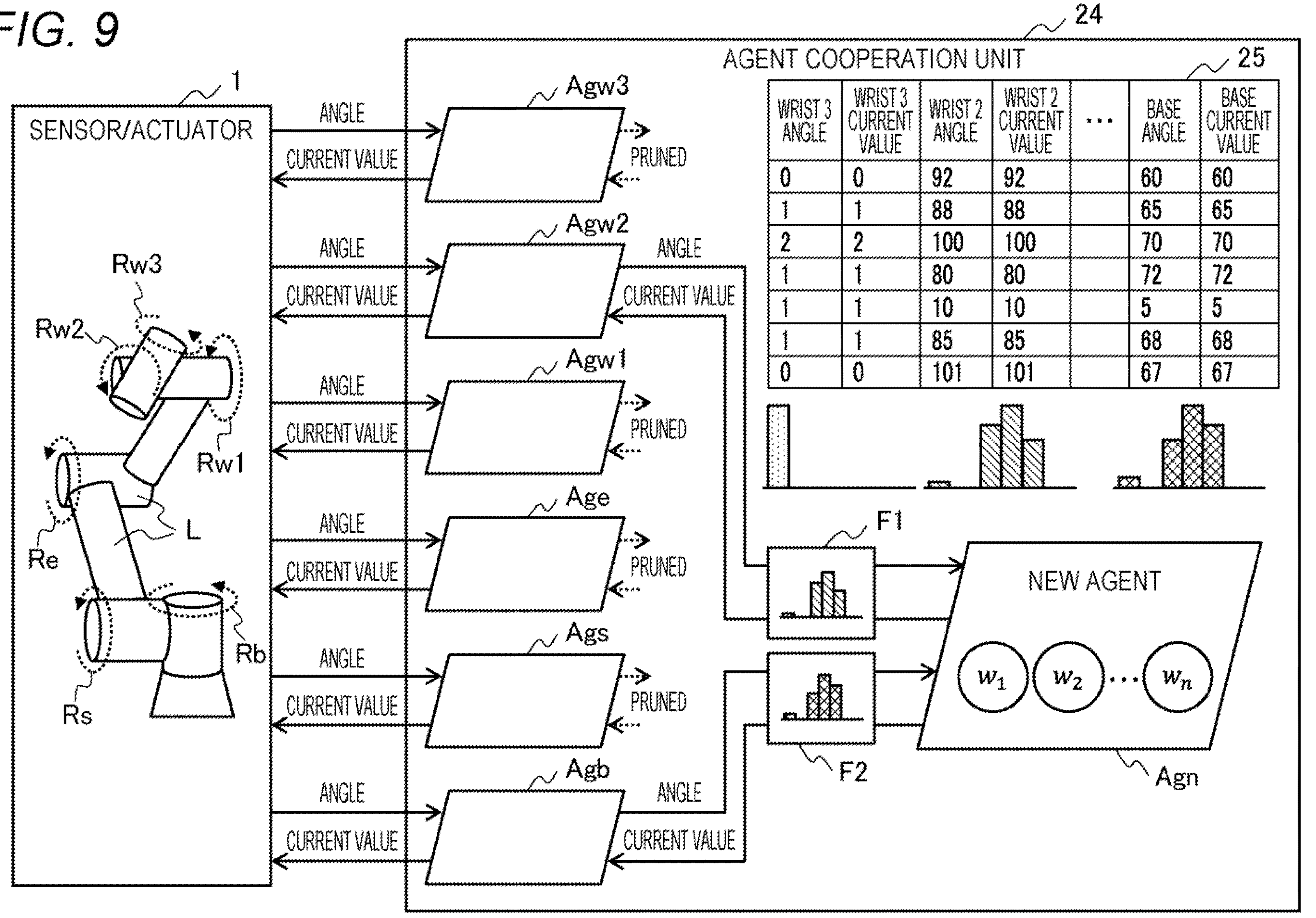
FIG. 9 is a diagram illustrating processing of the agent cooperation unit according to a third embodiment.

FIG. 9 is a diagram illustrating processing of the agent cooperation unit 24 according to the third embodiment. Although a new agent Agn is generated similarly to FIG. 4 also in this figure, command values (current values) and operation amounts (angles) of all the agents are evaluated under a certain target at this time. An evaluation table 25 indicates that the agents are divided into agents whose command values (current values) and operation amounts (angles) are large in magnitude and agents whose command values (current values) and operation amounts (angles) are small in magnitude.

When the command value (current value) and the operation amount (angle) are large, it is considered that a contribution ratio for achievement of the target is high, and conversely when the command value (current value) and the operation amount (angle) are small, it is considered that the contribution degree is low. From this result, the agents that contribute little are to be reviewed. Reviewing means deleting the agents that contribute little from an attention destination of the new agent, or further reducing the magnitude of the values of the agents so that the agents do not substantially function. The contribution to achievement of the target is not necessarily determined by the magnitude of the values. In a case where the agents are divided into agents whose values obtained in a certain period are large in variance and agents whose values are small in variance, it may be considered that the agent having a large variance may take any value, that is, the contribution degree of the agent is low, and the agent having a small variance is required to take a value in a specific range, that is, the contribution degree of the agent is high.

For example, in a case where the position of the robot arm tip is moved in the yaw direction, because the inputs and outputs other than those of the wrist 2 agent Agw2 and the base agent Agb hardly change (for example, as shown in the upper right table 25, input and output data is stored for a certain period), the corresponding inputs and outputs to and from the new agent Agn are deleted. Furthermore, a filter F is applied to input and output values on the basis of the tendency of the inputs and outputs of each agent Ag. For example, in a case where the angle as an input of the wrist 2 agent Agw2 is frequently a value around 90°, a filter is applied to increase resolution of values around 90° and decrease the resolution in the other range.

According to the third embodiment, when all the agents are selected and a new agent is generated for these agents, it is possible to discriminate between an effective agent that contributes to achievement of a target and an agent that does not, so that a new agent in a simple and low-cost form can be obtained.

Figure 10:
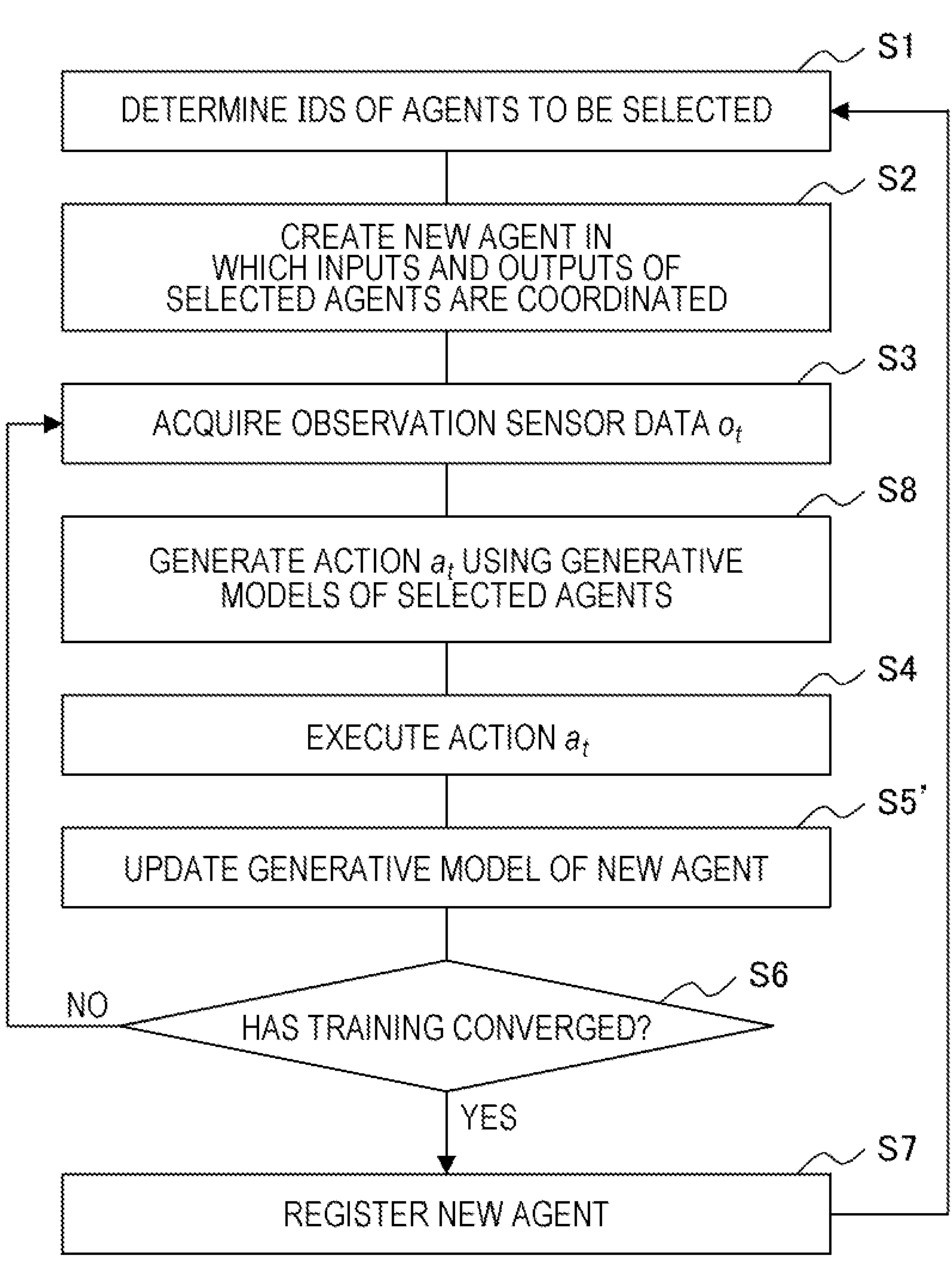
FIG. 10 is a diagram illustrating a processing flow example of an information processing system according to the third embodiment of the present invention in a formation phase of a new agent.

FIG. 10 is a diagram illustrating a processing flow example of an information processing system according to the third embodiment of the present invention in the formation phase of a new agent.

In the operation flow of the third embodiment in FIG. 10, first, in processing step S1, the attention unit 22 determines the IDs of agents Ag to be selected on the basis of the target or target category M received from the reception unit 21. In this case, it is assumed that all the agents are selected. The agents to be selected may not be all the agents. In a case where an agent in the same target category has already been registered in the agent management unit, the agents may be selected by reference to the attention of the agent. Next, in processing step S2, the agent cooperation unit 24 receives the agents Ag associated with the agent IDs determined by the attention unit 22 from the agent management unit 23 and creates a new agent Agn in which inputs and outputs of the agents are coordinated. In processing step S3, the agent cooperation unit 24 receives the observation sensor data Ot.

In newly added step S8, an action $a_t$ is generated using the generative models of the selected (all) agents. Thereafter, in processing step S4, the generated action $a_t$ is executed.

Subsequently, in processing step S5', the parameters of the generative model of the new agent are updated using the observation sensor data and the action. The update in this case includes update of the attention of the agents based on a result of evaluating command values (current values) and operation amounts (angles) of the agents.

In processing step S6, when training (update of the parameters) of the generative model has converged, in processing step S7, the new agent is registered in the agent management unit 23. When training has not converged, the processing returns to processing step S3, where the observation sensor data Ot is acquired again, and the similar processing is repeatedly executed.

Figure 11:
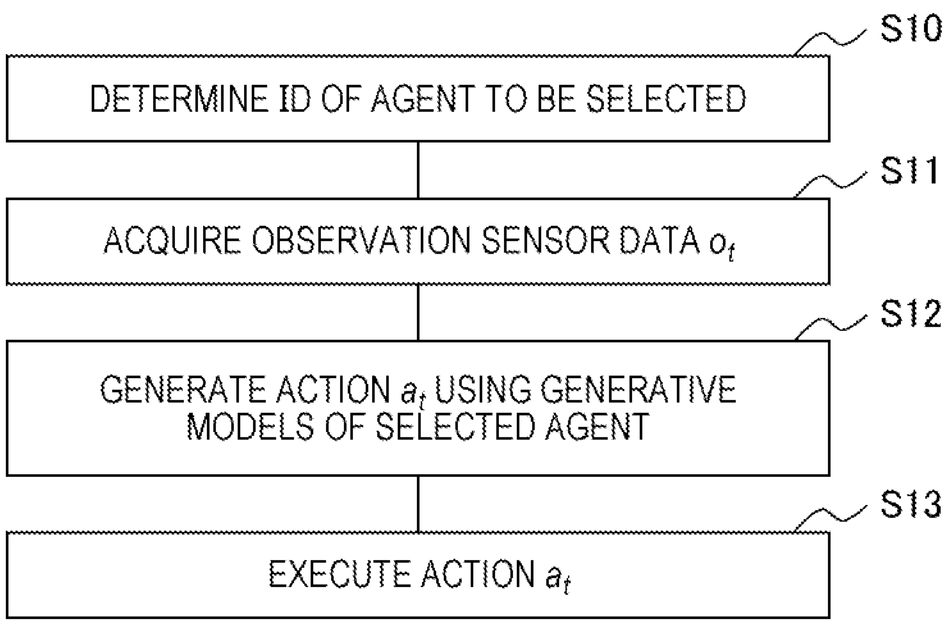
FIG. 11 is a diagram illustrating a processing flow example of the information processing system according to the third embodiment of the present invention in a use phase of an agent that has been registered in the agent management unit.

FIG. 11 is a diagram illustrating a processing flow example of the information processing system according to the third embodiment of the present invention in the use phase of an agent that has been registered in the agent management unit.

In the use phase, an agent corresponding to a given target is selected in step S10, the observation sensor data Ot is acquired in step S11, an action $a_t$ is generated using the generative model of the selected agent in step S12, and the action is executed in step S13.

As described above, in the third embodiment, the attention unit outputs all agents stored and managed by the agent management unit when a target is unknown or an agent that has not been learned is included, and the agent cooperation unit generates one or more new agents for all the agents and trains generative models of the one or more new agents. In addition, an effective new agent is selected from among the one or more new agents that have been generated and trained.

Fourth Embodiment

In the first embodiment, the information processing system for one robot including a plurality of joints has been described. On the other hand, in the fourth embodiment, a cooperative operation by a plurality of robots is controlled by one information processing system.

Figure 12:
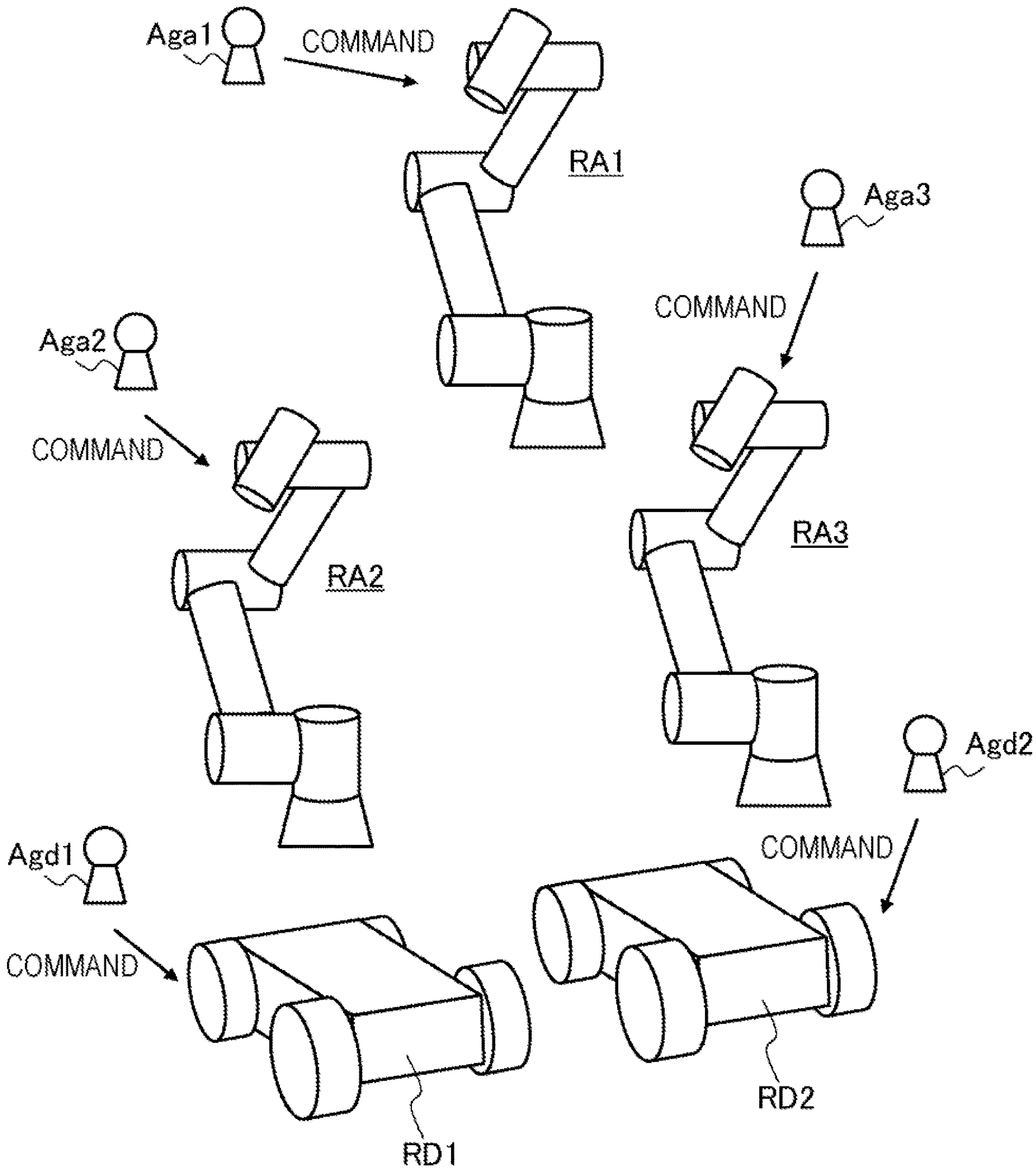
FIG. 12 is a diagram illustrating a setting example of primitive agents in a case where there is a plurality of autonomous robots.

FIG. 12 illustrates a setting example of primitive agents in a case where there is a plurality of autonomous robots. For example, in a system that operates in cooperation with three arm robots (RA1, RA2, RA3) and two dolly robots (RD1, RD2), an arm 1 agent Aga1, an arm 2 agent Aga2, an arm 3 agent Aga3, a dolly 1 agent Agd1, and a dolly 2 agent Agd2 are registered in the agent management unit 23 as the primitive agents.

Flexible setting of the primitive agents according to the hardware configuration of the system makes it possible to efficiently form an agent while using an agent that has already been learned.

What is claimed is:

1. An information processing system for an autonomous system, wherein the information processing system is configured to obtain observation sensor data regarding the autonomous system and a surrounding environment of the autonomous system and a target operation of the autonomous system, and the information processing system comprising:

an agent management unit that stores and manages an agent group comprising a plurality of agents, each agent being associated with a corresponding portion of the autonomous system and having a generative model specifying a relational expression between inputs and outputs for that corresponding portion;

an attention unit configured to select one or more agents from the agent group based on the target operation, wherein each agent of the agent group is configured to control movement of a corresponding portion of the autonomous system; and an agent cooperation unit configured to generate a new agent as a higher-level agent in which inputs and outputs of selected agents of the agent group are integrated in response to determining that an obtained target operation has not been learned and the attention unit has no basis for an agent selection, wherein the agent cooperation unit is configured to train a generative model of the new agent based on the observation sensor data and inputs and outputs of all agents in the agent group, and wherein the new agent is configured to control the selected agents of the agent group to achieve the obtained target operation.

2. The information processing system according to claim 1, wherein the agent management unit holds a new agent that has been generated and is configured to output an agent selected based on the target operation, and the agent cooperation unit is configured to update a generative model associated with a further new agent based on the observation sensor data and the selected agent and to output inter-agent cooperation information and the further new agent, and the information processing system comprises an action generation unit configured to generate an action based on the inter-agent cooperation information and to output the action to an actuator of the autonomous system.

3. The information processing system according to claim 1, wherein the attention unit is configured to output all agents stored and managed by the agent management unit when the target operation is unknown or an agent that has not been learned is included, and the agent cooperation unit is configured to generate one or more new agents for all the agents and to train generative models of the one or more new agents.

4. The information processing system according to claim 3, wherein an effective new agent is selected from among the one or more new agents that have been generated and trained.

5. The information processing system according to claim 3, wherein in order to select an effective new agent, the one or more new agents are generated by the agent cooperation unit selecting an agent having an input and output of a predetermined threshold or more by applying a predetermined filter to the inputs and outputs of the selected agents.

6. An autonomous system comprising an actuator configured to receive an output from the action generation unit in the information processing system according to claim 2 for the autonomous system to operate.

* * * * *